United States Patent
Mayberry et al.

(10) Patent No.: US 11,926,006 B2
(45) Date of Patent: Mar. 12, 2024

(54) COMPONENT MANUFACTURE AND EXTERNAL INSPECTION

(71) Applicant: Raytheon Company, Waltham, MA (US)

(72) Inventors: Travis Mayberry, Dallas, TX (US); Gregory G. Beninati, Salem, NH (US); Matthew Kelly, Indianapolis, IN (US); Michael Arthur, Indianapolis, IN (US)

(73) Assignee: RAYTHEON COMPANY, Waltham, MA (US)

( * ) Notice: Subject to any disclaimer, the term of this patent is extended or adjusted under 35 U.S.C. 154(b) by 84 days.

(21) Appl. No.: 17/204,556

(22) Filed: Mar. 17, 2021

(65) Prior Publication Data

US 2022/0297248 A1    Sep. 22, 2022

(51) Int. Cl.
B23P 15/26 (2006.01)
B22F 5/04 (2006.01)
B33Y 10/00 (2015.01)
B33Y 80/00 (2015.01)

(52) U.S. Cl.
CPC ............... B23P 15/26 (2013.01); B22F 5/04 (2013.01); B33Y 10/00 (2014.12); B33Y 80/00 (2014.12)

(58) Field of Classification Search
CPC . B33Y 10/00; B33Y 80/00; B22F 5/04; B23P 15/26
See application file for complete search history.

(56) References Cited

U.S. PATENT DOCUMENTS

| | | |
|---|---|---|
| 8,387,248 B2 | 3/2013 | Rolt |
| 10,315,248 B2 | 6/2019 | Smith |
| 10,823,511 B2 | 11/2020 | Vargas |
| 10,837,709 B2 | 11/2020 | Friestad, Jr. |
| 2008/0005903 A1 | 1/2008 | Trindade |
| 2012/0034097 A1 | 2/2012 | Marra |
| 2013/0056186 A1 | 3/2013 | Schalansky |
| 2013/0139990 A1 | 6/2013 | Appleby |
| 2015/0369054 A1 | 12/2015 | Propheter-Hinckley |
| 2020/0298352 A1 | 9/2020 | Malmborg |

OTHER PUBLICATIONS

International search report for PCT/US2022/020742 dated Jun. 25, 2022.

*Primary Examiner* — Moshe Wilensky
(74) *Attorney, Agent, or Firm* — Getz Balich LLC

(57) ABSTRACT

A method of manufacture is provided that includes providing a preform component. The preform component includes a blind aperture in an exterior of the preform component. The exterior of the preform component is machined to provide a machined component. An exterior of the machined component is inspected to determine a characteristic of the machined component, which characteristic of the machined component is associated with the blind aperture. Whether a feature of the machined component satisfies a standard is determined based on the characteristic of the machined component.

19 Claims, 12 Drawing Sheets

COMPONENT MANUFACTURE AND EXTERNAL INSPECTION

BACKGROUND OF THE DISCLOSURE

1. Technical Field

This disclosure relates generally to manufacture and inspection of a component with one or more internal features.

2. Background Information

A liquid flowthrough cooling plate includes one or more internal passages. During manufacture, a preform of the cooling plate may be formed using one or more known manufacturing techniques. This cooling plate preform may include one or more defects on an exterior of the preform. To remove these defects, one or more surfaces of the cooling plate preform may be machined flat. Depending upon the type and magnitude of the defect, however, such machining may overly thin or completely remove sidewall material of one or more of the internal passages thereby rendering the cooling plate unusable. To identify over-machining, an inspection process such as computed tomography (CT) scanning may be performed on the cooling plate in order to locate the internal passages within the cooling plate and/or determine the sidewall thickness of the cooling plate. Such an inspection process, however, may be costly and/or time consuming.

There is a need in the art for improved methods for manufacturing and inspecting components with one or more internal features.

SUMMARY OF THE DISCLOSURE

According to an aspect of the present disclosure, a method of manufacture is provided. During this method, a preform component is provided. The preform component includes a blind aperture in an exterior of the preform component. The exterior of the preform component is machined to provide a machined component. An exterior of the machined component is inspected to determine a characteristic of the machined component that is associated with the blind aperture. Whether a feature of the machined component satisfies a standard is determined based on the characteristic of the machined component.

According to another aspect of the present disclosure, another method of manufacture is provided. During this method, a preform component is provided. The preform component includes an aperture, a preform outer surface and an aperture end surface. The aperture extends into the preform component from the preform outer surface to the aperture end surface. The preform component is machined to provide a machined component with a machined outer surface. The machined component includes a portion of the aperture. The portion of the aperture extends into the machined component from the machined outer surface to the aperture end surface. A distance from the machined outer surface to the aperture end surface is measured. Whether a feature of the machined component meets a standard is determined based on the distance from the machined outer surface to the aperture end surface.

According to still another aspect of the present disclosure, another method of manufacture is provided. During this method, a preform component is provided. The preform component includes an inspection feature. The exterior of the preform component is machined to provide a machined component. The machined component is visually inspected to determine a characteristic of the machined component that is related to the inspection feature. Whether a non-visible feature of the machined component satisfies a standard is determined based on the characteristic of the machined component.

The inspection feature may be configured as or otherwise include an aperture or a protrusion.

The preform component may be additively manufactured. The preform outer surface may be a non-planar outer surface. The machined outer surface may be a planar outer surface.

The feature of the machined component may be a distance from a passage within the machined component to the machined outer surface.

The characteristic of the machined component may be presence of at least a portion of the blind aperture in the machined component.

The determining may include determining the feature of the machined component satisfies the standard where the machined component includes at least a portion of the blind aperture.

The determining may include determining the feature of the machined component does not satisfy the standard where the machining of the preform component completely removes the blind aperture.

The machined component may include at least a portion of the blind aperture. The characteristic of the machined component may be a depth of the at least a portion of the blind aperture.

The determining may include determining the feature of the machined component satisfies the standard where a depth of at least a portion of the blind aperture included in the machined component is equal to or greater than a value.

The determining may include determining the feature of the machined component does not satisfy the standard where a depth of at least a portion of the blind aperture included in the machined component is less than a value.

The feature of the machined component may be a dimension of the machined component.

The feature of the machined component may be a thickness of a sidewall of the machined component.

The feature of the machined component may be a distance between a passage within the machined component and an exterior surface of the machined component.

The providing of the preform component may include additively manufacturing the preform component.

The machining may include machining a preform outer surface of the preform component to provide the machined component with a machined outer surface. At least a portion of the blind aperture may extend into the machined component from the machined outer surface.

The preform outer surface may be a non-planar outer surface. In addition or alternatively, the machined outer surface may be a planar outer surface.

The machined component may include at least a portion of the blind aperture, an aperture end surface and an internal passage. The at least a portion of the blind aperture may extend vertically into the machined component to the aperture end surface. A side of the internal passage may be vertically aligned with the aperture end surface.

The machined component may include at least a portion of the blind aperture, an aperture end surface and an internal passage. The at least a portion of the blind aperture may extend vertically into the machined component to the aperture end surface. A side of the internal passage may be vertically displaced from the aperture end surface.

The machined component may be configured as or may be part of a heat exchanger.

The blind aperture may be configured as or otherwise include a stepped aperture.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

The present disclosure includes methods for manufacturing a component with one or more internal features. Each of these internal features is disposed partially or completely within an interior of the manufactured component. The internal features therefore may not be visible and/or easily accessible for inspection from an exterior of the manufactured component. The manufacturing methods of the present disclosure therefore may include techniques/processes for inspecting and/or acquiring information associated with the internal features from an exterior of the manufactured component without, for example, requiring costly and/or time consuming imaging processes; e.g., x-ray scanning, computed tomography (CT) scanning, etc.

Figure 1:
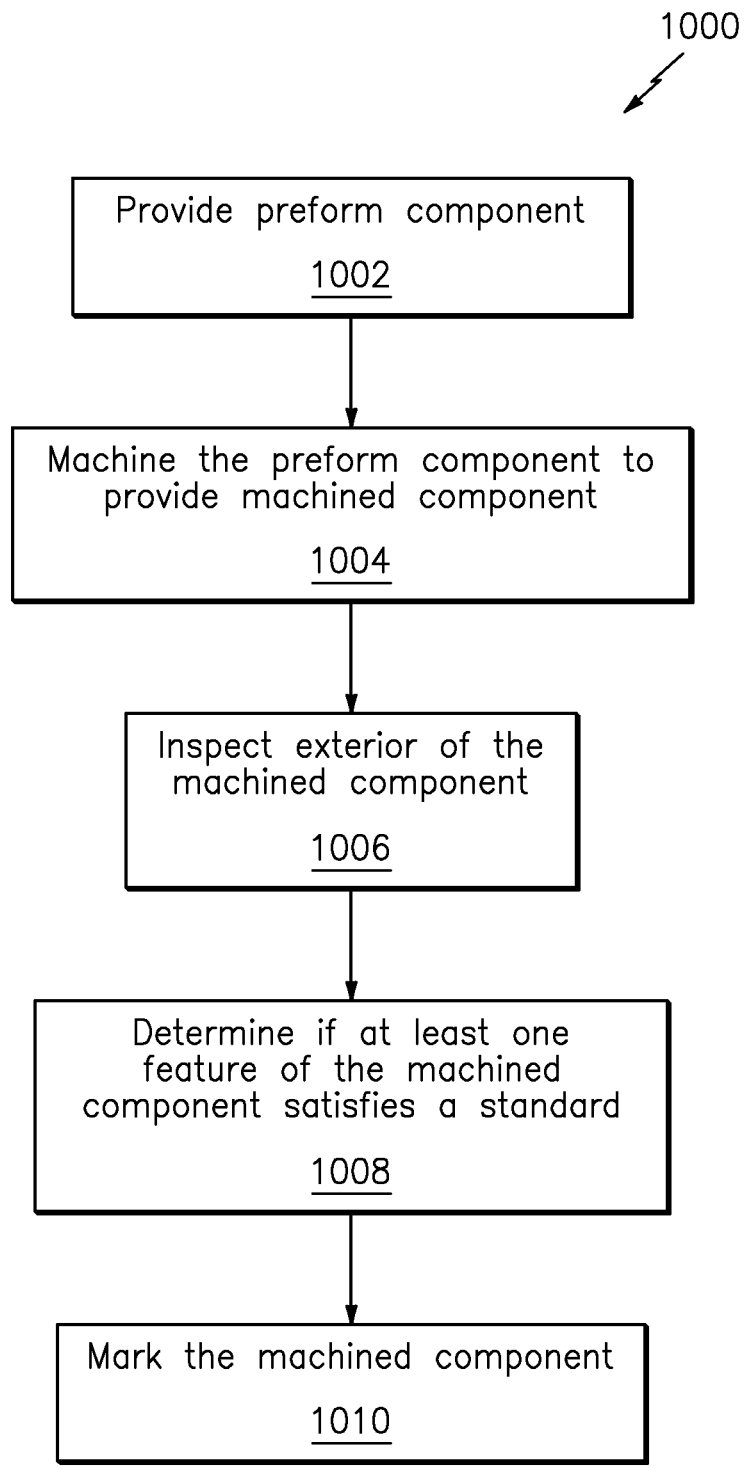
FIG. 1 is a flow diagram of a method for manufacturing a component.

FIG. 1 is a flow diagram of a method 1000 for manufacturing a component with at least one internal feature. For ease of description, the manufactured component is described below as a heat exchanger and the internal feature is described below as an internal passage. Examples of the heat exchanger include, but are not limited to, a heat exchanger plate (e.g., a liquid flowthrough cold plate), a heat spreader, a radiator and a section/module of a modular heat exchanger. The heat exchanger may be configured as a liquid-to-liquid heat exchanger, a gas-to-liquid heat exchanger and/or a gas-to-gas heat exchanger. The present disclosure, however, is not limited to manufacturing such exemplary heat exchangers nor to heat exchanger applications. For example, in other embodiments, the manufacturing method 1000 may be performed to manufacture a fluid vessel (e.g., a tank) or a fluid conduit. The present disclosure is also not limited to embodiments where the internal feature is an internal passage. For example, in other embodiments, the internal feature may alternatively be or also include an internal cavity, an internal core, a portion of the manufactured component with a different porosity and/or density, or any other type of volume and/or element disposed at least partially or completely within the manufactured component. Such manufactured components may be utilized for various applications including, but not limited to, mobile devices (e.g., land vehicles, watercraft, aircraft, spacecraft, projectiles, missiles, etc.), sensor systems, communication systems and control systems.

Figure 2:
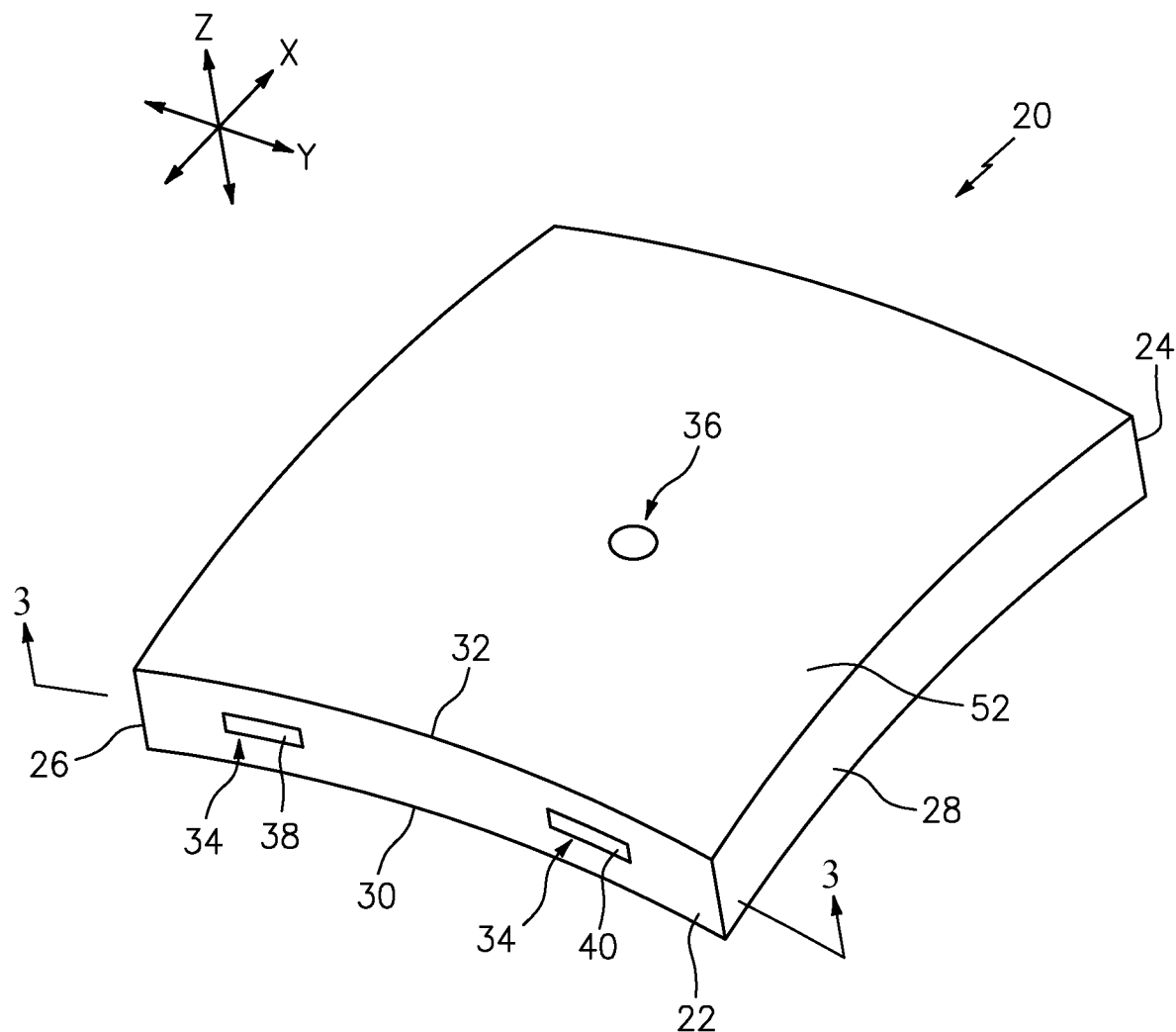
FIG. 2 is a schematic perspective illustration of a preform component.

In step 1002, a preform 20 of the manufactured component is provided. A schematic perspective illustration of the preform component 20 is illustrated in FIG. 2. This preform component 20 has an exterior with opposing longitudinal sides 22 and 24, opposing lateral sides 26 and 28 and opposing vertical sides 30 and 32. The preform component 20 extends longitudinally (e.g., along an x-axis) between and to the longitudinal sides 22 and 24. The preform component 20 extends laterally (e.g., along a y-axis) between and to the lateral sides 26 and 28. The preform component 20 extends vertically (e.g., along a z-axis) between and to the vertical sides 30 and 32.

The preform component 20 of FIG. 2 includes the at least one internal passage 34 (the internal feature), ends of which passage 34 are visible in FIG. 2. The preform component 20 of FIG. 2 also includes at least one inspection aperture 36; e.g., a recess, a groove, a channel, a notch, a dimple, etc.

Figure 3:
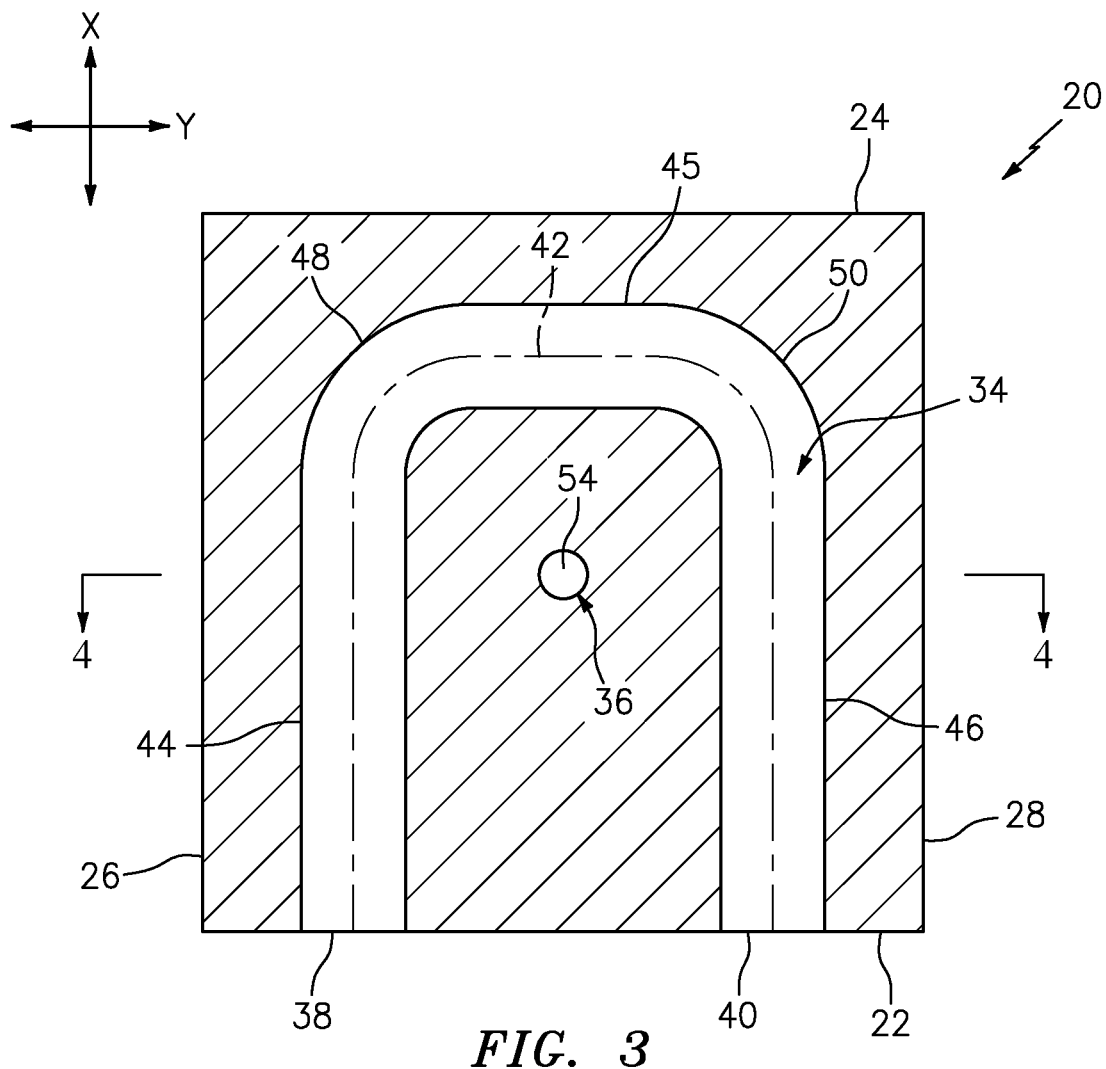
FIG. 3 is a schematic sectional illustration of the preform component taken along line 3-3 in FIG. 2.

Referring to FIG. 3, the internal passage 34 may have an inlet 38 and an outlet 40. The internal passage 34 of FIG. 3 extends along a centerline 42 of the internal passage 34, within the preform component 20, between and to the inlet 38 and the outlet 40. The internal passage 34 and its centerline 42 may include one or more straight sections 44-46. The internal passage 34 and its centerline 42 may also or alternatively include one or more non-straight sections 48 and 50; e.g., curved sections, arcuate sections, winding sections, serpentine sections, etc. The internal passage 34 and its centerline 42 may thereby follow a tortuous trajectory within the preform component 20; see also FIG. 12. The present disclosure, however, is not limited to such an exemplary internal passage configuration.

Figure 4:
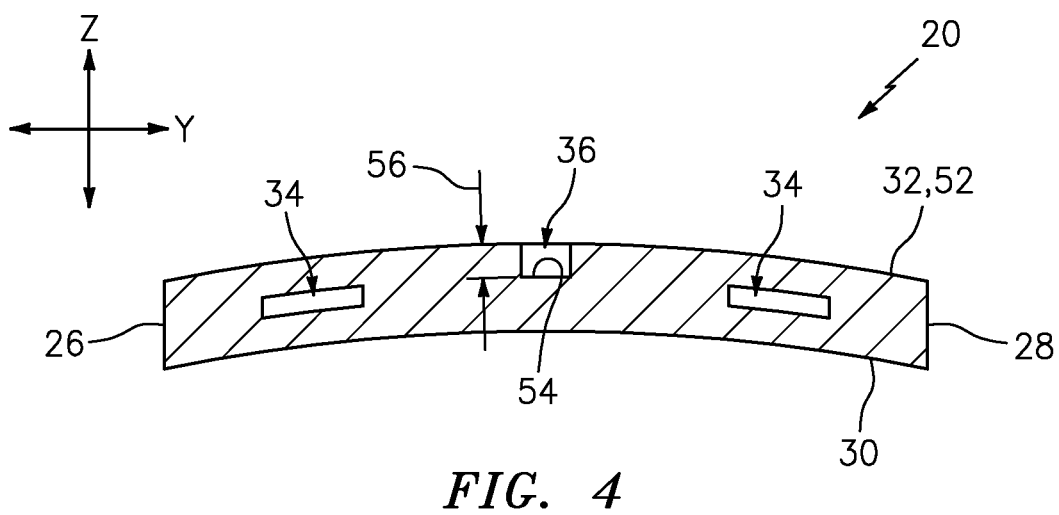
FIG. 4 is a schematic sectional illustration of the preform component taken along line 4-4 in FIG. 3.

Referring to FIG. 4, the inspection aperture 36 may be configured as a blind aperture. The inspection aperture 36 of FIG. 4, for example, extends partially into the preform component 20 from a preform outer surface 52 of the preform component 20 to an aperture end surface 54 of the preform component 20. The preform outer surface 52 of FIG. 4 is located at (e.g., on, adjacent or proximate) the second vertical side 32 of the preform component 20. The aperture end surface 54 is located vertically between the vertical sides 30 and 32 of the preform component 20. The aperture end surface 54 is disposed a vertical distance 56 (e.g., along the z-axis) from the preform outer surface 52, which vertical distance 56 defines a vertical depth of the inspection aperture 36 within the preform component 20.

The preform component 20 may be formed by additive manufacturing using an additive manufacturing device. The term "additive manufacturing" may describe a process where a component or components are formed by accumulating and/or fusing material together, typically in a layer-on-layer manner. Layers of powder material, for example, may be disposed and thereafter solidified sequentially onto one another to form the component(s). The term "solidify" is used herein to describe a process whereby material is sintered and/or otherwise melted thereby causing discrete particles or droplets of the sintered and/or melted material to fuse together. Examples of the additive manufacturing process include a laser powder bed fusion (LPBF) process and an electron beam powder bed fusion (EB-PBF) process. Examples of the additive manufacturing device include a laser powder bed fusion (LPBF) device and an electron beam powder bed fusion (EB-PBF) device. Of course, various other additive manufacturing processes and devices are known in the art, and the present disclosure is not limited to any particular ones thereof. Furthermore, the present disclosure is not limited to additive manufacturing formation processes. For example, the preform component 20 may also or alternatively be formed by casting and/or machining.

Figure 5:
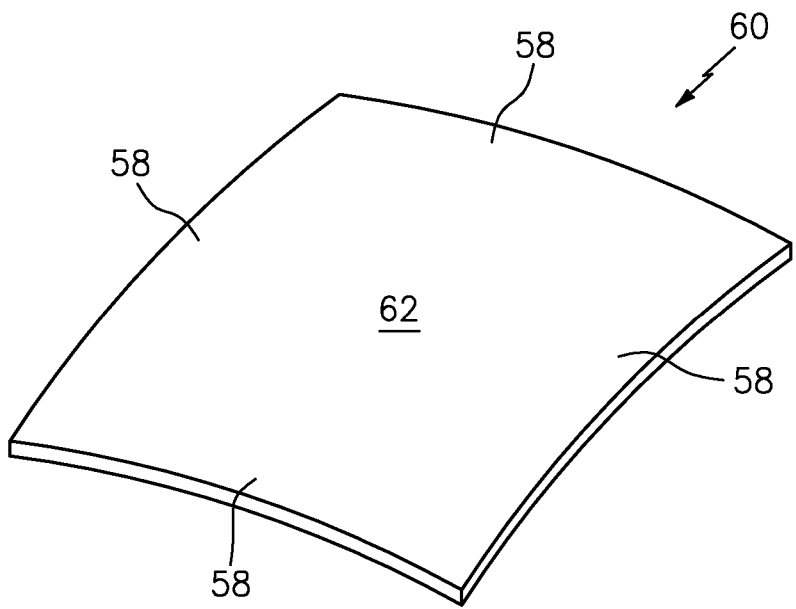
FIG. 5 is a schematic perspective illustration of an additively manufactured layer of the preform component.

The preform component 20 may include one or more defects. The term "defect" may describe an artifact from the preform component formation process which may be accounted for (e.g., removed and/or otherwise altered) in subsequent step(s) of the manufacturing method 1000. For example, where the preform component 20 is additively manufactured, one or more or all of the layers of material forming the preform component 20 may be individually or collectively subjected to uneven temperature differentials thereacross. For example, referring to FIG. 5, end portions 58 of a newly solidified layer 60, for example, may cool quicker than an intermediate/middle portion(s) 62 of that newly solidified layer 60. This uneven cooling may cause the newly formed layer 60 to warp; e.g., cup, "potato chip", etc. The preform outer surface 52 of FIGS. 2 and 4 may therefore have a non-planar (e.g., non-flat) geometry. The preform outer surface 52, for example, may be a curved (e.g., cupped) or wavy outer surface. Of course, the preform component 20 may also or alternatively include various other types of defects.

Figure 6:
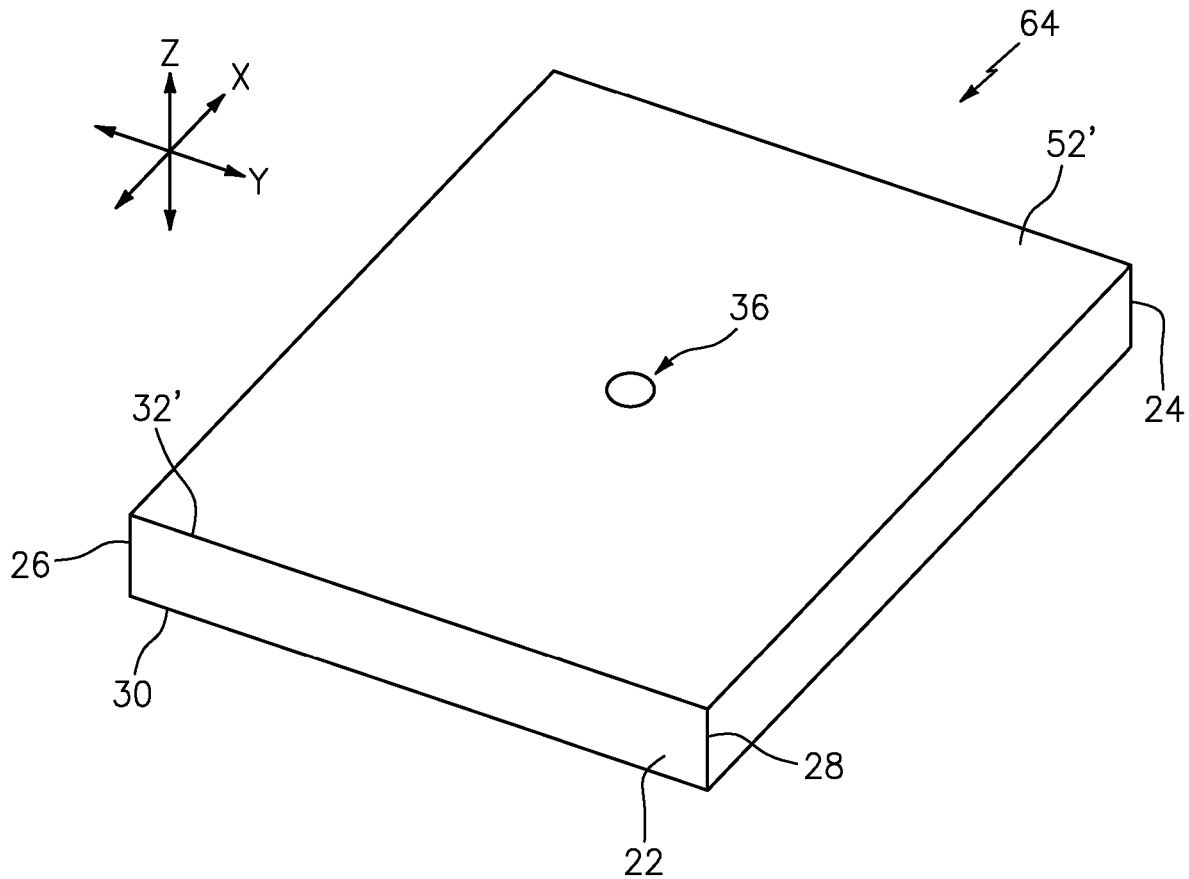
FIG. 6 is a schematic illustration of a machined component.

In step 1004, the preform component 20 is machined to provide a machined component 64 (see FIG. 6). At least a portion (or an entirety) of the preform outer surface 52 (see FIG. 2), for example, may be planed, milled and/or otherwise machined to provide the machined component 64 with a machined outer surface 52' at the second vertical side 32' (see FIG. 6). This machined outer surface 52' may have a planar geometry. The machined outer surface 52' of FIG. 6, for example, is a flat outer surface. The machining step 1004 may thereby remove the outer surface curvature and/or waviness from the preform component 20; e.g., remove the formation process artifact(s). Of course, one or more additional portions of the preform component 20 (e.g., one or more of the surfaces at the sides 22, 24, 26, 28 and/or 30) may also be at least partially or completely machined to provide the machined component 64.

Figure 7A:
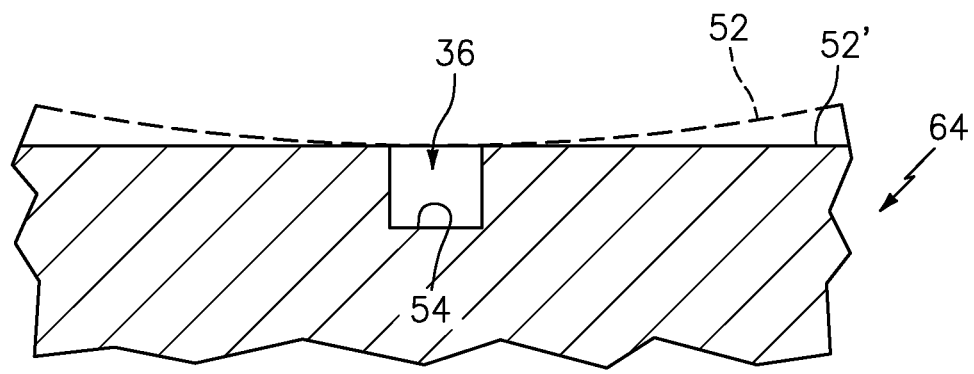
FIGS. 7A-7C are schematic sectional illustrations depicting various manners in which the preform component may be machined to provide the machined component.
Figure 7B:
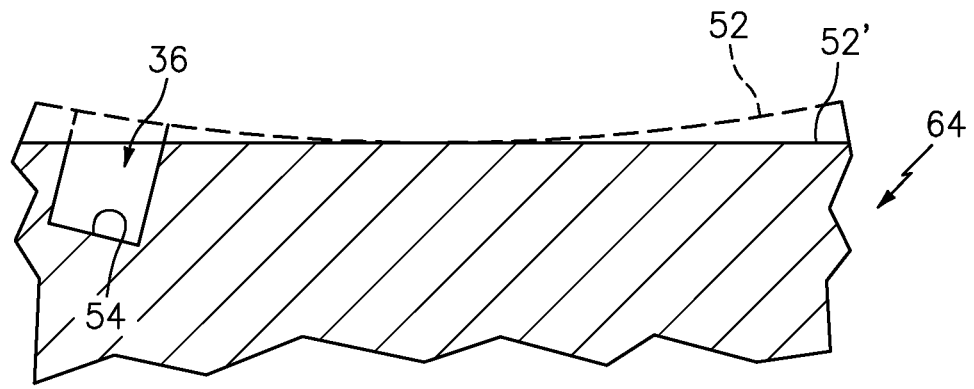
Figure 7C:
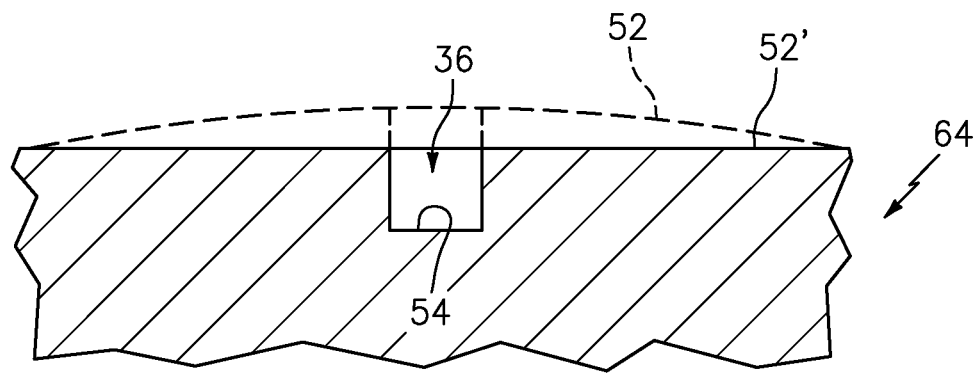

The machined component 64 of FIG. 6 may include at least a portion (or an entirety) of the inspection aperture 36 from the preform component 20. FIG. 7A illustrates an embodiment where the machined component 64 includes an entirety of the inspection aperture 36. FIGS. 7B and 7C illustrate embodiments where the machined component 64 includes a portion of the inspection aperture 36.

Figure 8:
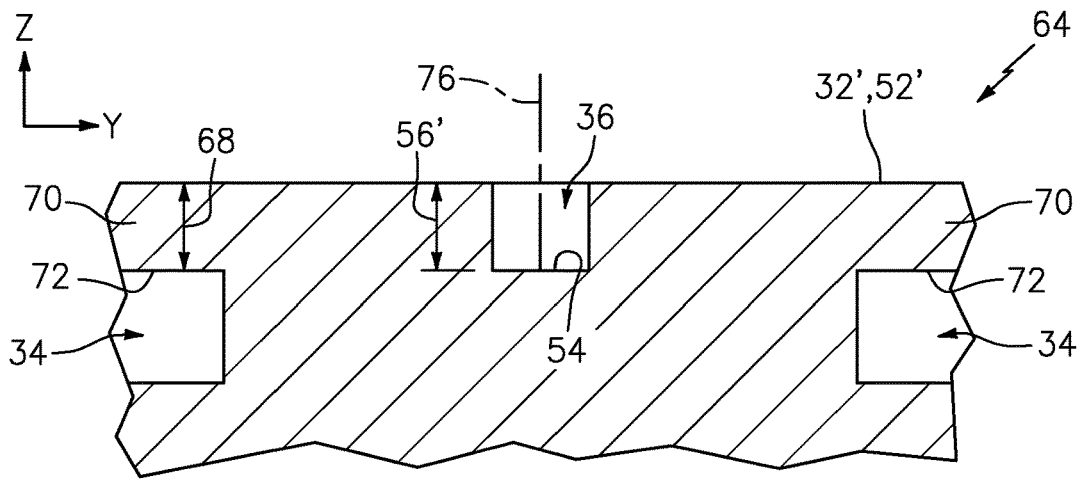
FIG. 8 is a schematic sectional illustration of a portion of the machined component with at least one inspection aperture and at least one internal feature.

In step 1006, an exterior of the machined component 64 is inspected. Referring to FIG. 8, this inspection is performed to determine at least one (e.g., external) characteristic of the machined component 64 that is associated with/related to the inspection aperture 36.

The inspection aperture characteristic may be whether an entirety or at least a portion of the inspection aperture 36 is still present in the machined component 64. The presence (or lack of presence) of the inspection aperture 36 in the machined component 64 may be determined via, for example, a visual inspection of the exterior of the machined component 64 and, more particularly, its machined outer surface 52'. This visual inspection may be performed manually by a human inspector (e.g., via human eye). The visual inspection may also or alternatively be performed using an inspection system; e.g., an automated camera inspection system. The manufacturing method 1000, however, is not limited to the foregoing exemplary visual inspection techniques.

The inspection aperture characteristic may also or alternatively be (or indicative of) a dimension 56' (e.g., a vertical depth) of the inspection aperture 36 (e.g., the remaining inspection aperture portion) in the machined component 64. The dimension 56' of the remaining inspection aperture 36 in the machined component 64 may be determined using a manual inspection device; e.g., a set of measurement calipers. The dimension 56' of the inspection aperture 36 may also or alternatively be determined using an inspection system; e.g., an automated contact or non-contact inspection system such as, but not limited to, a coordinate measurement machine (CCM) or a (e.g., white or blue) light measurement system. The manufacturing method 1000, however, is not limited to the foregoing exemplary dimensional inspection techniques.

In step 1008, at least one feature of the machined component 64 is determined as satisfying or not satisfying a (e.g., design and/or manufacturing) standard. The determination of whether or not the feature satisfies the standard may be made based on the inspection aperture characteristic of the machined component 64.

The machined component feature may be a dimension or another internal characteristic of the machined component 64. For example, the feature may be a thickness 68 of a sidewall 70 of the machined component 64, or alternatively indicative of or otherwise related to the sidewall thickness 68. The sidewall 70 of FIG. 8 extends vertically between and at least partially forms the machined outer surface 52' and a peripheral boundary 72 of the internal passage 34. The sidewall thickness 68 may be measured as a (e.g., shortest and/or perpendicular) vertical distance from the machined outer surface 52' to the internal passage 34 and its peripheral boundary 72. The manufacturing method 1000, however, is not limited to the foregoing exemplary machined component features.

Figure 9A:
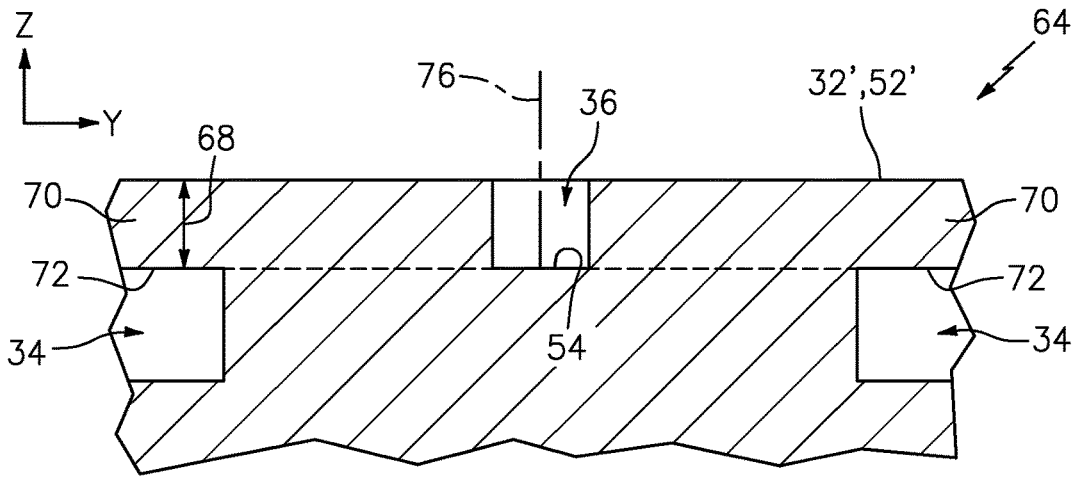
FIGS. 9A and 9B are schematic sectional illustrations depicting various arrangements of the inspection aperture relative to the internal feature.
Figure 9B:
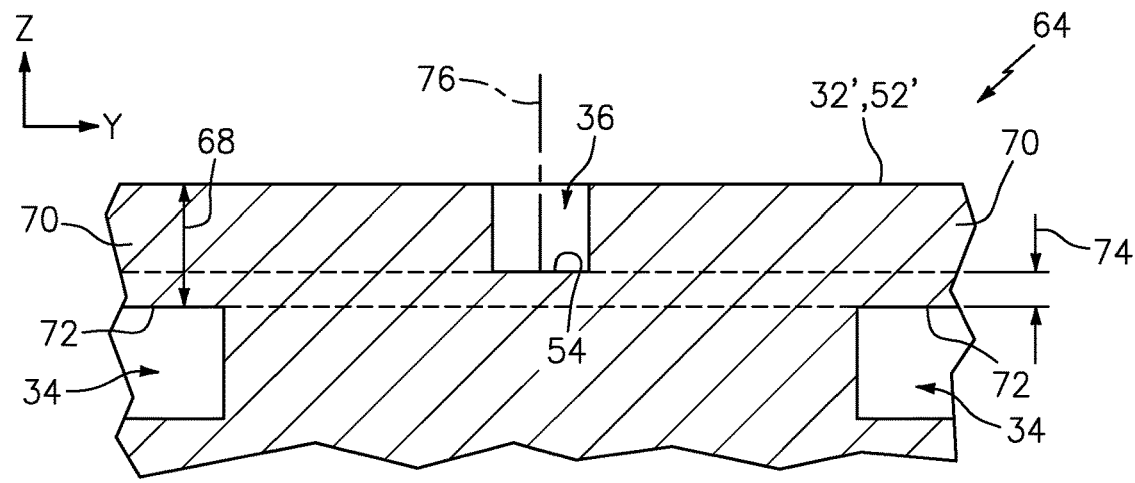

The machined component feature is related to the inspection aperture 36. For example, the inspection aperture 36 may be spatially located at a known location proximate the internal passage 34 (the internal feature). The inspection aperture 36 may also be configured (e.g., sized, arranged, etc.) to provide information regarding the internal passage 34 (the internal feature). For example, referring to FIG. 9A, the aperture end surface 54 may be vertically aligned (e.g., along the z-axis) with the peripheral boundary 72 (e.g., a vertical side) of the internal passage 34 (the internal feature). Alternatively, referring to FIG. 9B, the aperture end surface 54 may be vertically displaced (along the z-axis) from the peripheral boundary 72 (e.g., the side) of the internal passage 34 (the internal feature) a known vertical distance 74. The aperture end surface 54 of FIG. 9B, for example, is positioned vertically (along the z-axis) between the peripheral boundary 72 (e.g., the side) of the internal passage 34 and the machined outer surface 52'. By positioning the aperture end surface 54 (e.g., see FIG. 9A or 9B) at a known (e.g., vertical) location relative to the internal passage 34 (the internal feature) and its peripheral boundary 72 (e.g., the side), the location of the peripheral boundary 72 (e.g., the side) can be determined by knowing the depth of the inspection aperture 36 in the machined component 64. Thus, information regarding the internal passage 34 (the internal feature) can be determined by inspecting the exterior of the machined component 64 without using, for example, costly and/or time consuming imaging processes; e.g., x-ray scanning, computed tomography (CT) scanning, etc.

Where the machined component 64 includes the entirety (or at least a portion) of the inspection aperture 36, a determination may be made that sufficient material is still present between the internal passage 34 (the internal feature) and the machined outer surface 52'. For example, since the entirety (or at least a portion) of the inspection aperture 36 is present, it can be determined the sidewall thickness 68 is within specification of the standard. Thus, the machined component 64 may be identified/classified as meeting the standard; e.g., complying with/being within design tolerances. However, where the machined component 64 only includes a portion of the inspection aperture 36 or none of the inspection aperture 36, a determination may be made that there is insufficient material present between the internal passage 34 (the internal feature) and the machined outer surface 52'. For example, since only a portion or none of the inspection aperture 36 is present, it can be determined the sidewall thickness 68 is outside specification of the standard. Thus, the machined component 64 may be identified/classified as not meeting the standard.

Where the depth of the inspection aperture 36 in the machined component 64 is measured as being equal to or greater than a (e.g., predetermined, design) value, a determination may be made that sufficient material is still present between the internal passage 34 (the internal feature) and the machined outer surface 52'. Thus, the machined component 64 may be identified/classified as meeting the standard. However, where the depth of the inspection aperture 36 in the machined component 64 is measured as being less than the (e.g., predetermined, design) value, a determination may be made that there is not sufficient material present between the internal passage 34 (the internal feature) and the machined outer surface 52'. Thus, the machined component 64 may be identified/classified as not meeting the standard.

In step 1010, the machined component 64 is marked and/or otherwise identified as satisfying or not satisfying the standard. Where the machined component 64 meets the standard, that machined component 64 is identified for further downstream processing; e.g., further machining, finishing and/or assembly. Where the machined component 64 does not meet the standard, that machined component 64 is identified for other processing; e.g., reworking and/or discarding.

The machined component 64 may be identified by applying a marking (e.g., writing, a label, etc.) onto the machined component 64. The machined component 64 may also or alternatively be identified by placing the machined component 64 into a respective bin, placing the machined component 64 on a respective shelf, etc. The manufacturing method 1000, however, is not limited to the foregoing exemplary identification (e.g., marking) techniques.

Figure 10A:
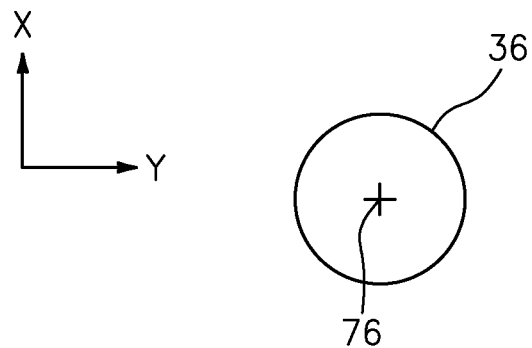
FIGS. 10A-10C are illustrations depicting various inspection aperture cross-sectional geometry shapes.
Figure 10B:
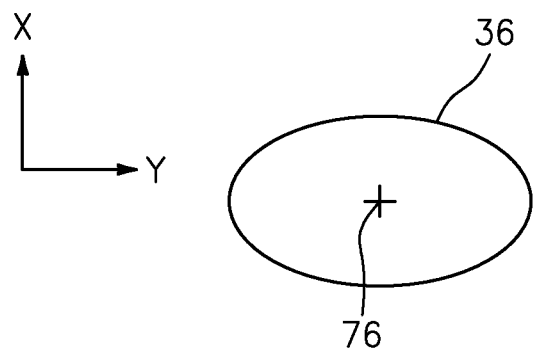
Figure 10C:
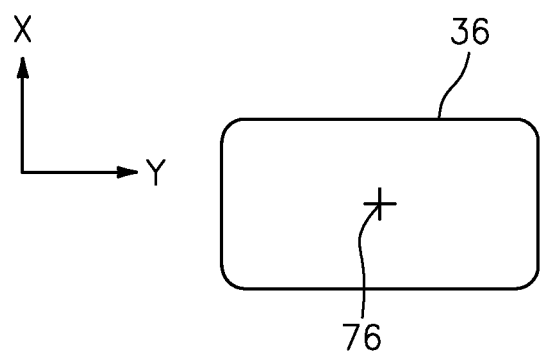

Referring to FIG. 10A, one or more or all of the inspection apertures 36 may have a circular cross-sectional geometry when viewed, for example, perpendicular to a centerline 76 of the respective inspection aperture 36. Referring to FIGS. 10B and 10C, one or more or all of the inspection apertures 36 may also or alternatively have a non-circular cross-sectional geometry when viewed, for example, perpendicular to the respective inspection aperture centerline 76. For example, the inspection aperture cross-sectional geometry may be substantially or exactly oval, elliptical or polygonal (e.g., square, rectangular, etc.) shaped. The present disclosure, however, is not limited to the foregoing exemplary inspection aperture configurations.

In some embodiments, referring to FIG. 4, the inspection aperture 36 may be configured with a uniform depth; e.g., the vertical distance 56. More particularly, the inspection aperture 36 may extend vertically into the preform component 20 to the single aperture end surface 54.

Figure 11:
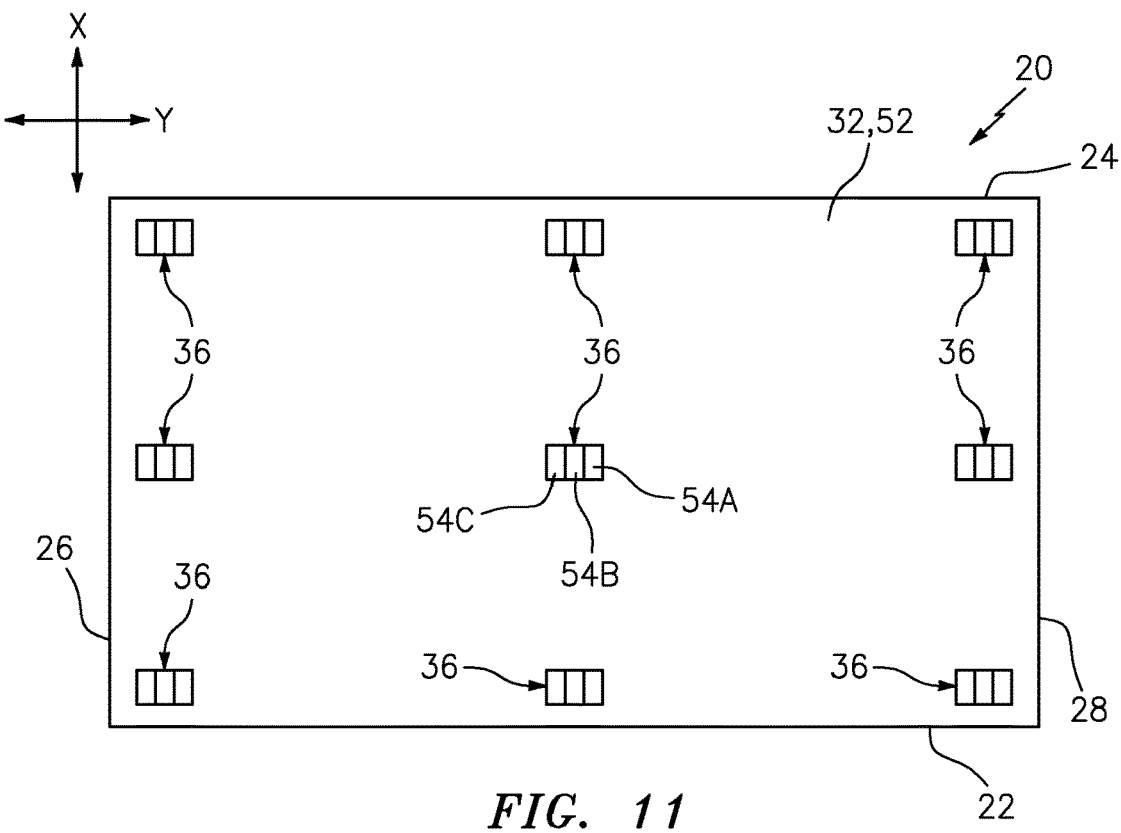
FIG. 11 is an illustration of the preform component configured with a plurality of stepped inspection apertures.
Figure 12:
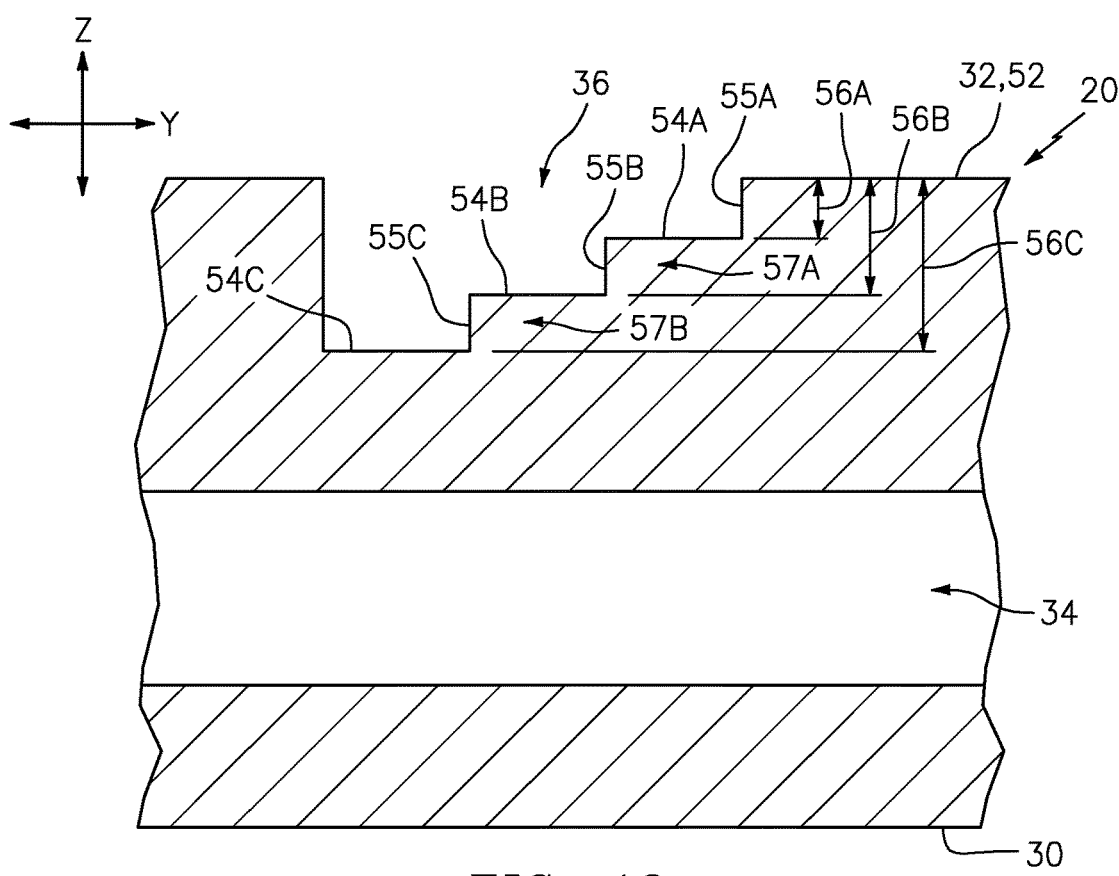
FIG. 12 is a sectional illustration of a portion of the preform component configured with one of the stepped inspection apertures.

In some embodiments, referring to FIGS. 11 and 12, one or more or all of the inspection apertures 36 may each be configured with a varying depth; e.g., a stepped depth. The inspection aperture 36 of FIG. 12, for example, is configured as a stepped aperture. This inspection aperture 36 extends vertically into the preform component 20 to a plurality of aperture end surfaces 54A-C. The first end surface 54A is disposed a (e.g., uniform) first vertical distance 56A from the preform outer surface 52. Thus, a first riser surface 55A extends vertically between the preform outer surface 52 and the first end surfaces 54A. The second end surface 54B is disposed a (e.g., uniform) second vertical distance 56B from the preform outer surface 52, which second vertical distance 56B is greater than the first vertical distance 56A. Thus, a second riser surface 55B extends vertically between the first and the second end surfaces 54A and 54B. The third end surface 54C is disposed a (e.g., uniform) third vertical distance 56C from the preform outer surface 52, which third vertical distance 56C is greater than the second vertical distance 56B. Thus, a third riser surface 55C extends vertically between the second and the third end surfaces 54B and 54C.

Each of the aperture end surfaces 54A, 54B, 54C may be associated with a corresponding attribute. For example, if all of the aperture end surfaces 54A-C are present (e.g., visible) following the machining step 1004, it may be determined that the machined component satisfies the standard. If each of the aperture end surfaces 54B and 54C are present (e.g., visible) following the machining step 1004, it may also be determined that the machined component satisfies the standard. Note, where each of the aperture end surfaces 54B and 54C is still present, a portion of a step 57A which defined the original aperture end surface 54A and the riser surface 55B may still be present. The presence of at least a portion of this step 57A/the riser surface 55B may indicate the surface 54B is in its original form. If a portion of the step 57B which defined the original aperture end surface 54B and the riser surface 55C is machined away during the machining step 1004, it may be determined that the machined component does not satisfy the standard. The present disclosure, however, is not limited to the foregoing exemplary end surface/step attribute assignments.

Figure 13:
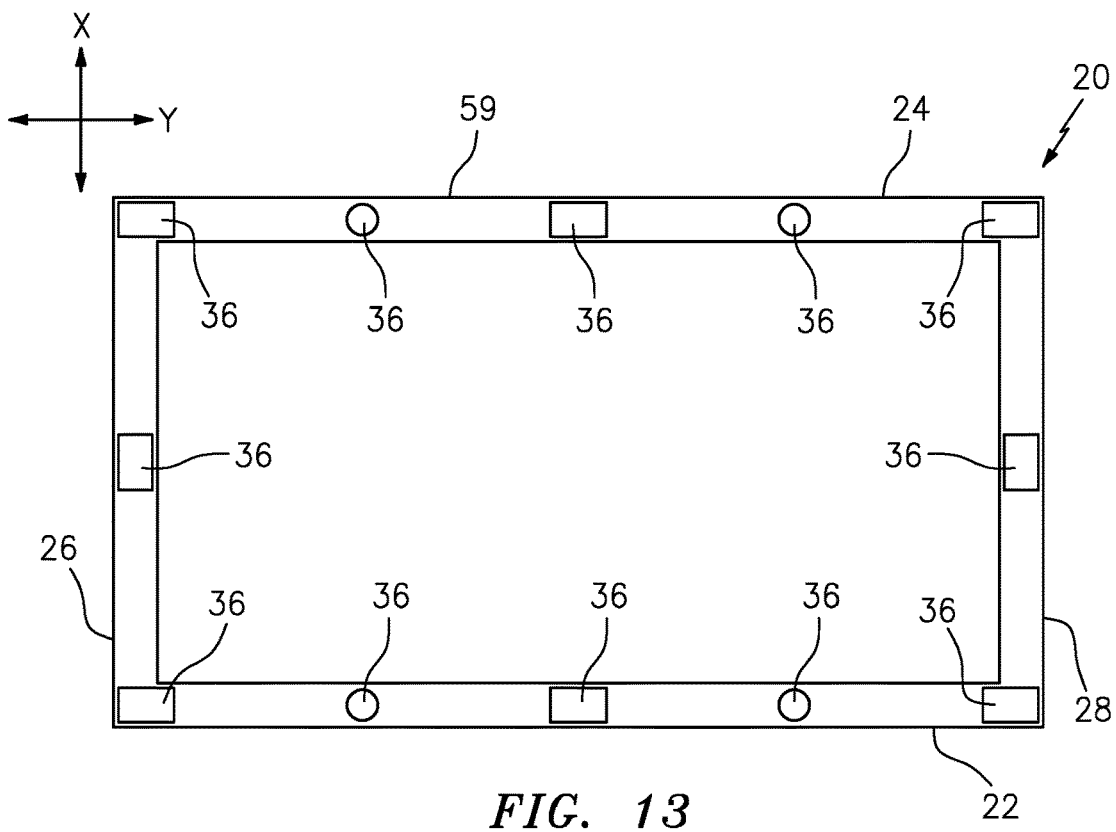
FIG. 13 is an illustration of the preform component configured with a raised rim.
Figure 14:
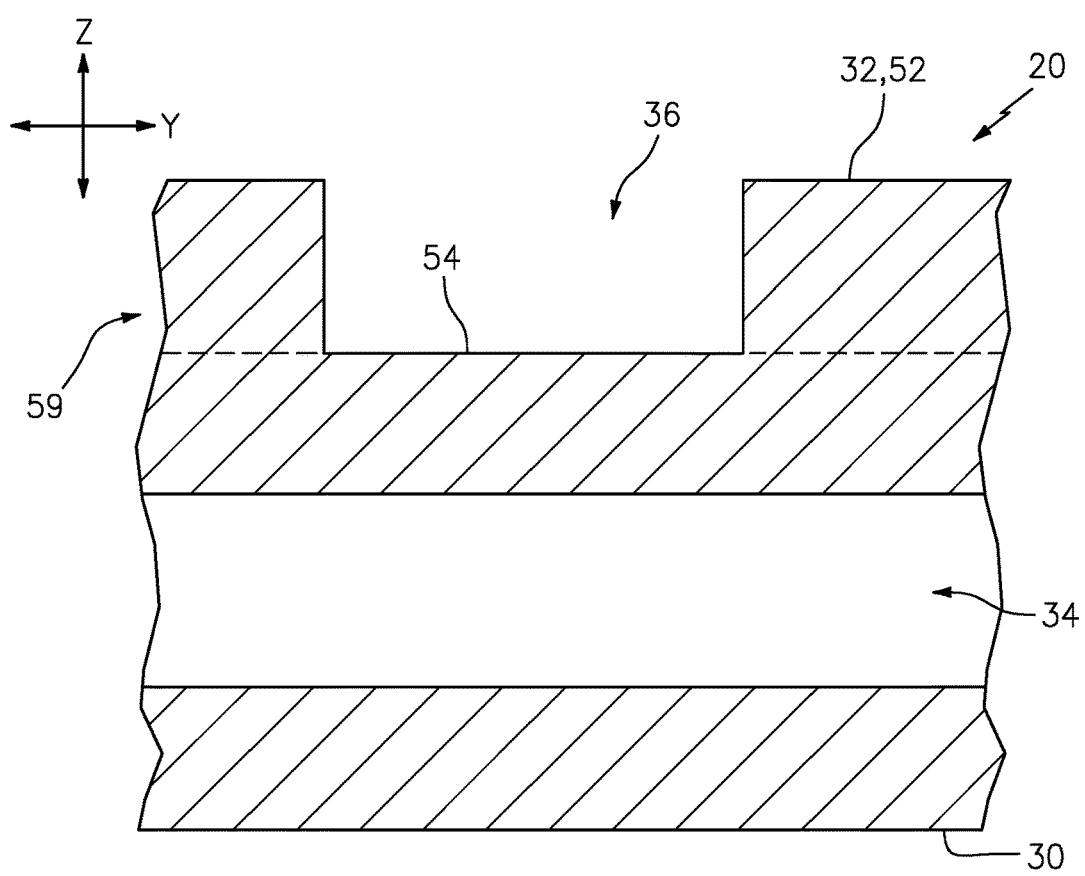
FIG. 14 is a sectional illustration of a portion of the preform component configured with one of the inspection apertures in the raised rim.

In some embodiments, referring to FIGS. 13 and 14, one or more or all of the inspection apertures 36 may each be disposed in a raised portion of the preform component 20. The inspection apertures 36 of FIGS. 13 and 14, for example, are arranged in a raised rim portion 59 extending partially or completely about an outer peripheral portion of the preform component 20. The machined component may be inspected using the inspection apertures 36 in the raised rim portion 59 using the method 1000 discussed above. Then following the inspection step 1006, the (e.g., remaining/unmachined portion) of the raise rim portion 59 may be left or machined away.

Figure 15:
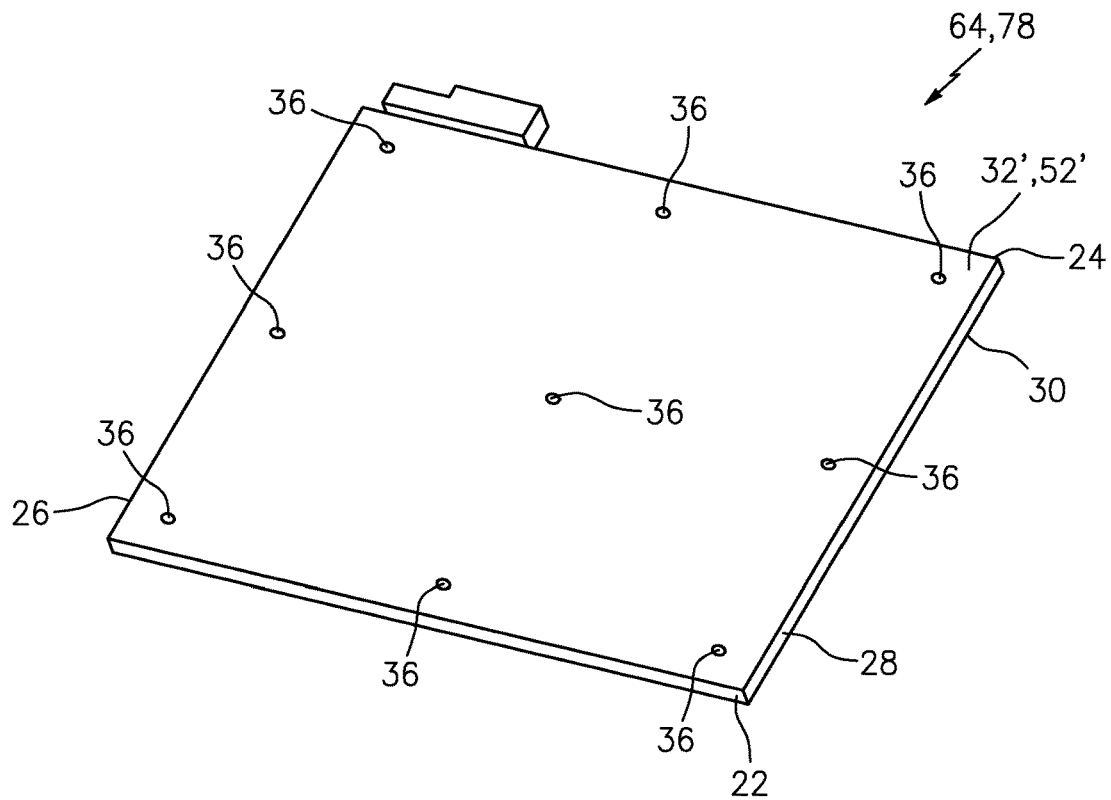
FIG. 15 is a perspective illustration of a heat exchanger plate.
Figure 16:
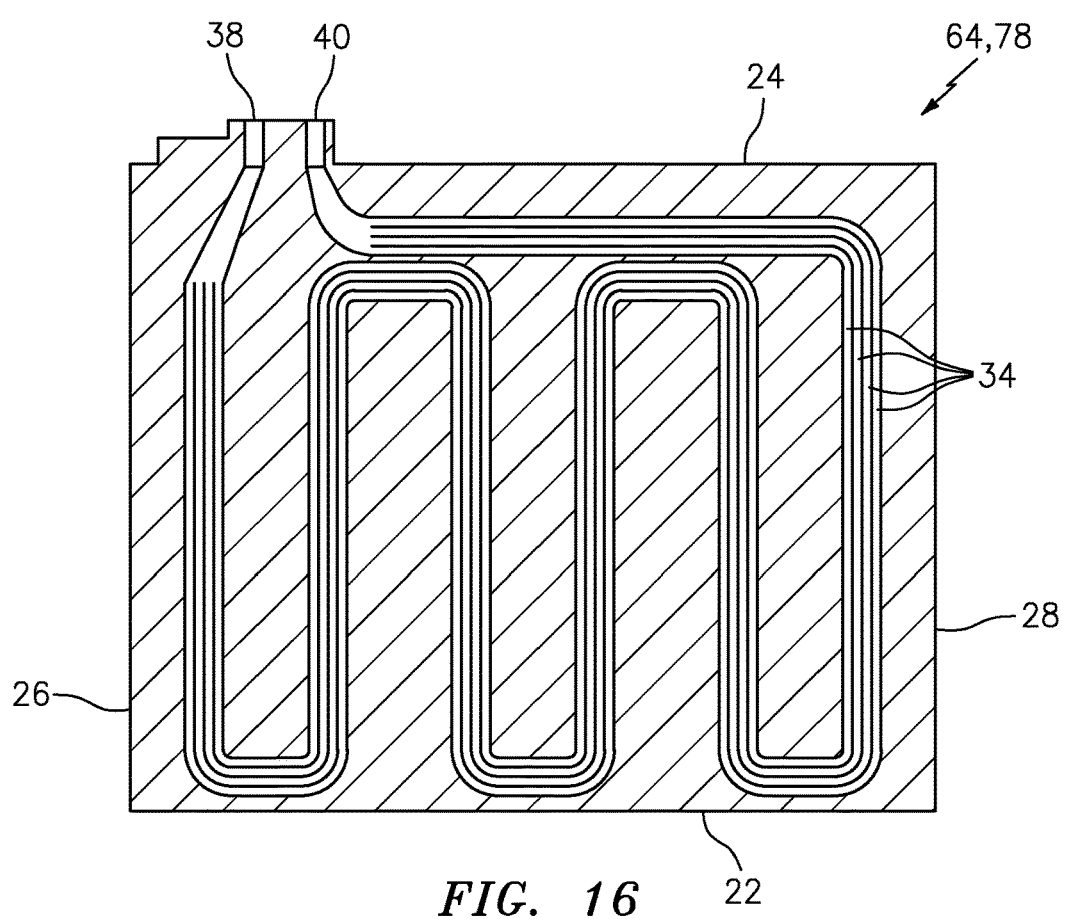
FIG. 16 is a sectional illustration of the heat exchanger plate.

FIGS. 15 and 16 illustrate the machined component 64 (the manufactured component) as a heat exchanger plate 78; e.g., a cooler plate. This machined component 64 includes a plurality of the inspection apertures 36 at various locations along the machined outer surface 52'. Each of these inspection apertures 36 is configured to provide information about respective portions of one or more internal passages 34 (internal features) within the machined component 64 as described above.

Figure 17:
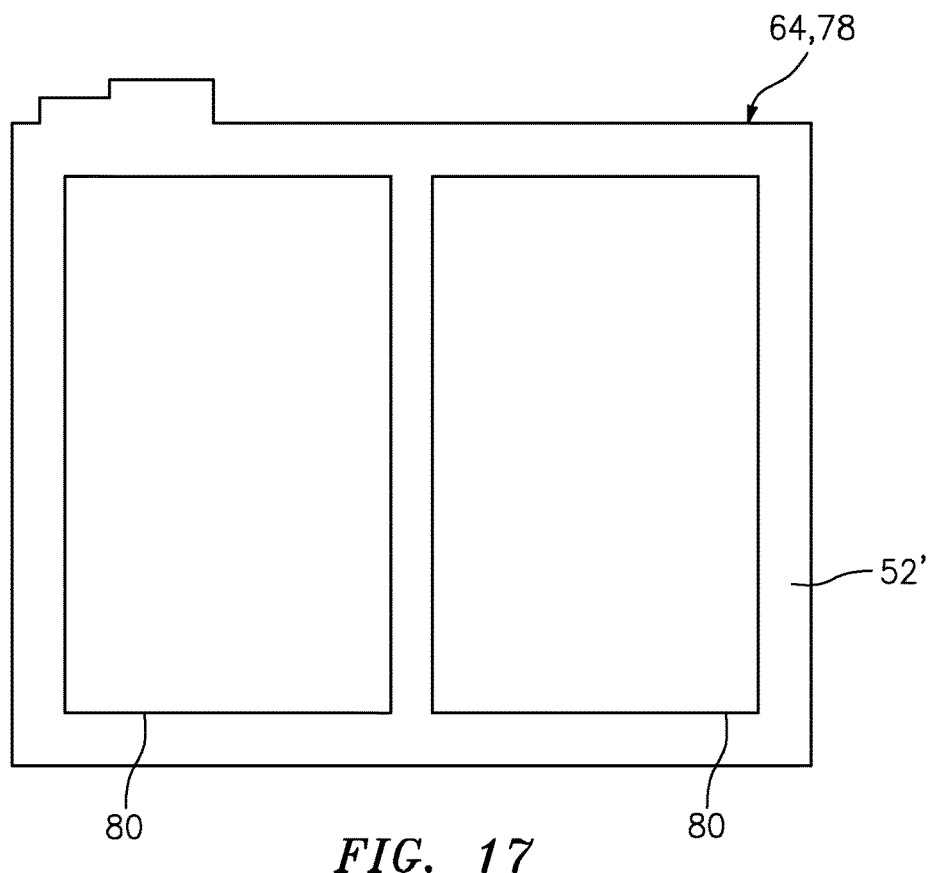
FIG. 17 is a schematic illustration of the heat exchanger plate configured with one or more additional components.

Referring to FIG. 17, one or more additional components 80 (e.g., electronics) may be mounted to the machined component 64. The additional components 80, for example, may be mounted to the machined outer surface 52'.

Figure 18:
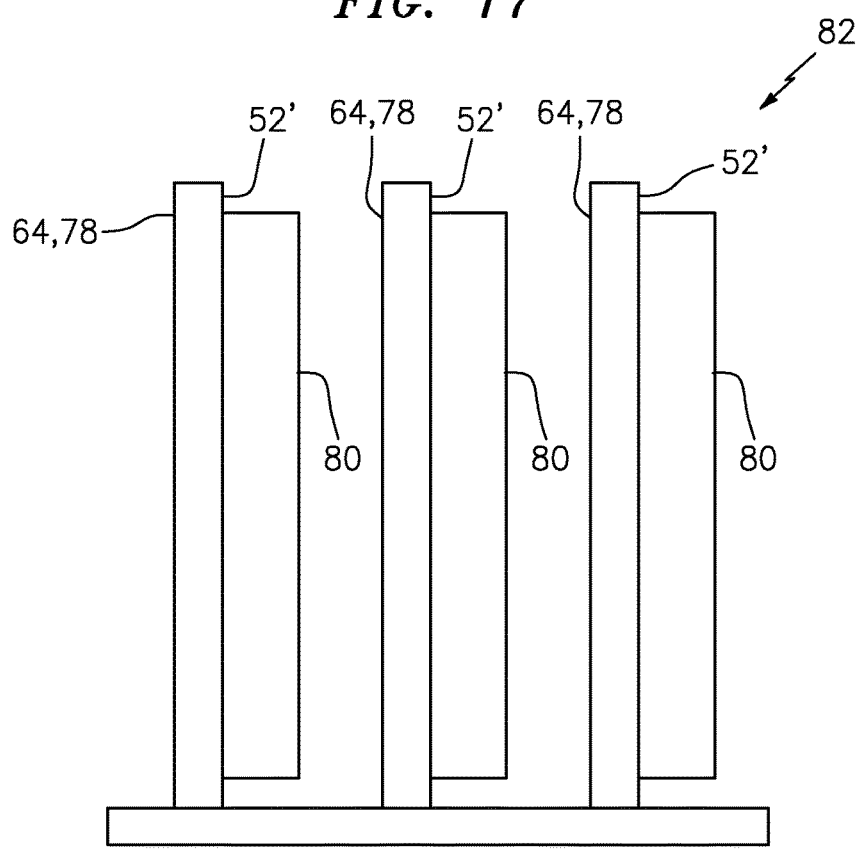
FIG. 18 is a schematic illustration of a heat exchanger system.

Referring to FIG. 18, a plurality of the machined components 64 may be assembled or otherwise arranged together to provide a heat exchanger system 82. The present disclosure, however, is not limited to such an exemplary heat exchanger system nor to manufacturing heat exchange components as described above.

Figure 19:
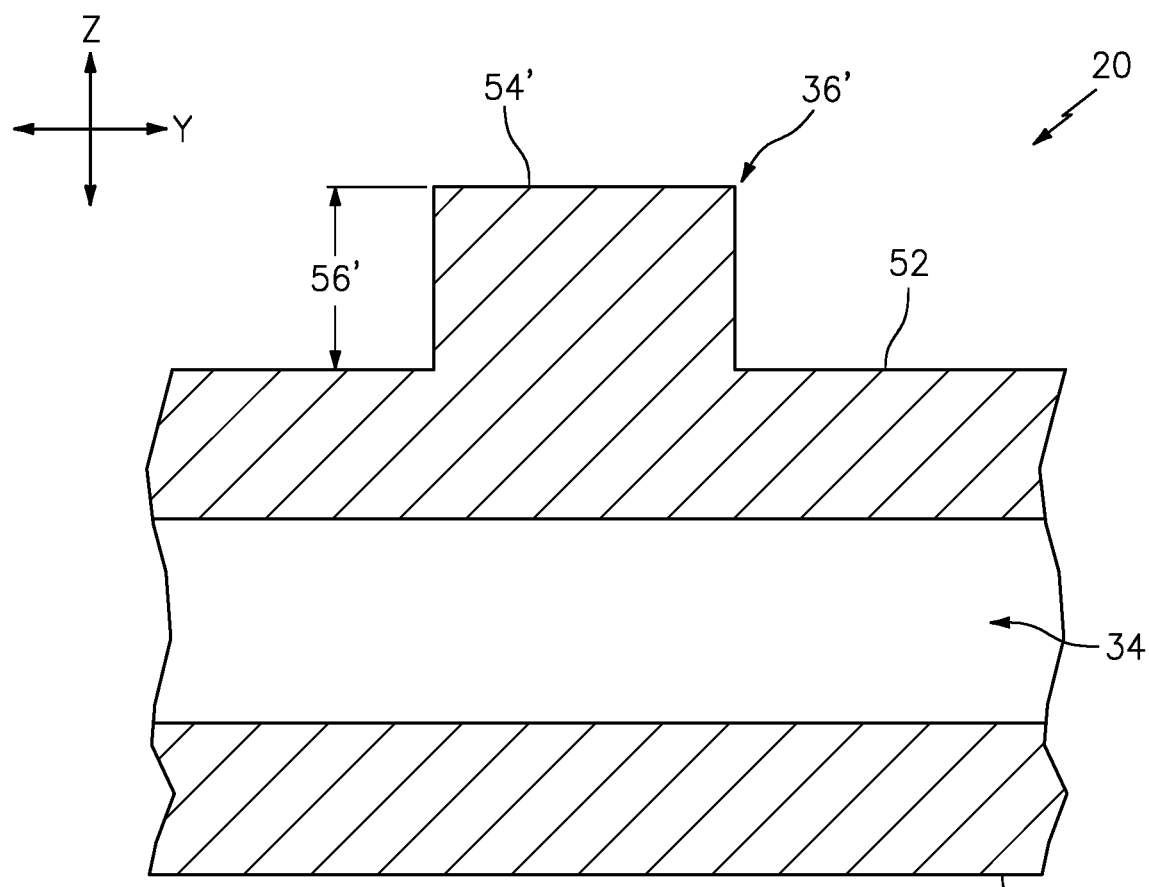
FIG. 19 is a sectional illustration of a portion of the preform component configured with an inspection protrusion.

In some embodiments, referring to FIG. 19, one or more of all of the inspection apertures 36 may each be replaced with an inspection protrusion 36'. This inspection protrusion 36' may essentially be an inverse of the inspection aperture 36 discussed above. The inspection protrusion 36', for example, may be a rib, a pedestal, a step or any other protrusion with one or more (e.g., known) datums; e.g., geometry, dimensions, etc. The inspection protrusion 36' of FIG. 19, for example, projects vertically out from the preform outer surface 52 to a distal end surface 54' of the respective inspection protrusion 36' a known vertical distance 56'. This inspection protrusion 36' may be utilized in the method 1000 in a similar manner as the inspection aperture 36. For example, if at least a portion of this inspection protrusion 36' remains following the machining step 1004, it may be determined that the machined component satisfies the standard. Of course, following the inspection step 1006, the inspection protrusion 36' may be completely removed from the machined component.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure.

Accordingly, the present disclosure is not to be restricted except in light of the attached claims and their equivalents.

What is claimed is:

1. A method of manufacture, comprising:
providing a preform component, the preform component including an internal passage and a blind aperture in an exterior of the preform component, wherein the blind aperture is fluidly discrete from the internal passage, the blind aperture is located between the internal passage and an outer peripheral portion of the preform component such that the blind aperture and the internal passage are separated by a blind aperture distance;
machining the exterior of the preform component to provide a machined component, wherein the machined component includes at least a portion of the blind aperture, an aperture end surface and the internal passage, wherein the at least a portion of the blind aperture extends vertically into the machined component to the aperture end surface, and wherein a side of the internal passage is vertically aligned with the aperture end surface;
inspecting an exterior of the machined component to determine a characteristic of the machined component that is associated with the blind aperture; and
determining whether a feature of the machined component satisfies a standard based on the characteristic of the machined component.

2. The method of claim 1, wherein the characteristic of the machined component comprises presence of the at least a portion of the blind aperture in the machined component.

3. The method of claim 1, wherein the determining comprises determining the feature of the machined component satisfies the standard where the machined component includes the at least a portion of the blind aperture.

4. The method of claim 1, wherein the characteristic of the machined component comprises a depth of the at least a portion of the blind aperture.

5. The method of claim 1, wherein the determining comprises determining the feature of the machined component satisfies the standard where a depth of the at least a portion of the blind aperture included in the machined component is equal to or greater than a value.

6. The method of claim 1, wherein the determining comprises determining the feature of the machined component does not satisfy the standard where a depth of the at least a portion of the blind aperture included in the machined component is less than a value.

7. The method of claim 1, wherein the feature of the machined component comprises a dimension of the machined component.

8. The method of claim 1, wherein the feature of the machined component comprises a thickness of a sidewall of the machined component.

9. The method of claim 1, wherein the feature of the machined component comprises a distance between the internal passage within the machined component and an exterior surface of the machined component.

10. The method of claim 1, wherein the providing of the preform component comprises additively manufacturing the preform component.

11. The method of claim 1, wherein
the machining comprises machining a preform outer surface of the preform component to provide the machined component with a machined outer surface; and
the at least a portion of the blind aperture extends into the machined component from the machined outer surface.

12. The method of claim 11, wherein at least one of
the preform outer surface is a non-planar outer surface; or
the machined outer surface is a planar outer surface.

13. The method of claim 1, wherein the blind aperture comprises a stepped aperture.

14. A method of manufacture, comprising:
providing a preform component, the preform component including an aperture, a passage, a preform outer surface and an aperture end surface, the aperture extending into the preform component from the preform outer surface to the aperture end surface, and the aperture is fluidly discrete from the passage;
machining the preform component to provide a machined component with a machined outer surface, the machined component including a portion of the aperture, and the portion of the aperture extending into the machined component from the machined outer surface to the aperture end surface;
measuring a distance from the machined outer surface to the aperture end surface; and
determining whether a feature of the machined component meets a standard based on the distance from the machined outer surface to the aperture end surface.

15. The method of claim 14, wherein
the preform component is additively manufactured;
the preform outer surface is a non-planar outer surface; and
the machined outer surface is a planar outer surface.

16. The method of claim 14, wherein the feature of the machined component is indicative of a distance from the passage within the machined component to the machined outer surface.

17. A method of manufacture, comprising:
providing a preform component, the preform component including an inspection feature, the inspection feature comprising an aperture, wherein an opening to the aperture is formed in an exterior surface of the preform component at an exterior of the preform component, and wherein the exterior surface of the preform component circumscribes the opening of the aperture;
machining the exterior surface of the preform component to provide a machined component with a machined exterior surface, the machining of the exterior surface removing material from all around the opening to the aperture to form a new opening to the aperture in the machined exterior surface, and wherein the machined exterior surface circumscribes the new opening to the aperture;
visually inspecting the machined component to determine whether the inspection feature is visible; and
determining whether a non-visible feature of the machined component satisfies a standard based on the visually inspecting, wherein the non-visible feature of the machined component is determined as meeting the standard where the inspection feature is visible, and wherein the non-visible feature of the machined component is determined as not meeting the standard where the inspection feature is not visible.

18. The method of claim 14, wherein
the feature of the machined component is determined as meeting the standard where the distance from the machined outer surface to the aperture end surface is greater than a predetermined value; and
the feature of the machined component is determined as not meeting the standard where the distance from the machined outer surface to the aperture end surface is less than the predetermined value.

19. The method of claim 1, wherein
the blind aperture projects into the preform component from an exterior surface of the preform component; and
the exterior surface of the preform component extends circumferentially around and forms an opening to the blind aperture.

* * * * *